F. D. DRAKE.

Evaporating Pan.

No. 1,565. Reissued Nov. 10, 1863.

Witnesses:

H. A. Coombs

Chas. A. Fisher

Inventor:

F. D. Drake per Munn & Co. attorneys

AM. PHOTO-LITHO. CO. N.Y. (OSBORNE'S PROCESS.)

UNITED STATES PATENT OFFICE.

F. D. DRAKE, OF FOUR CORNERS, OHIO.

IMPROVEMENT IN EVAPORATORS FOR SACCHARINE LIQUIDS.

Specification forming part of Letters Patent No. 37,339, dated January 6, 1863; Reissue No. 1,565, dated November 10, 1863.

*To all whom it may concern:*

Be it known that I, F. D. DRAKE, of Four Corners, in the county of Huron and State of Ohio, have invented a new and Improved Evaporator for Saccharine Liquids; and I do hereby declare that the following is a full, clear, and exact description of the same, reference being had to the accompanying drawings, forming a part of this specification, in which—

Figure 1:
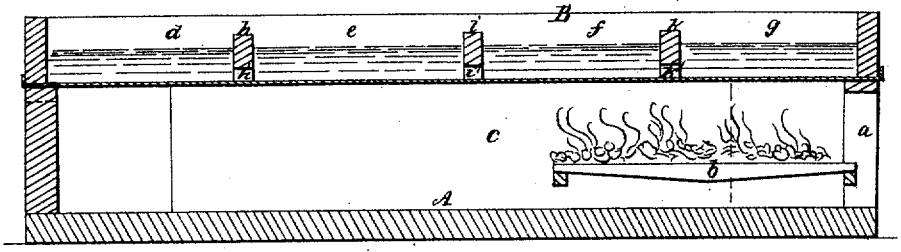
Figure 2:
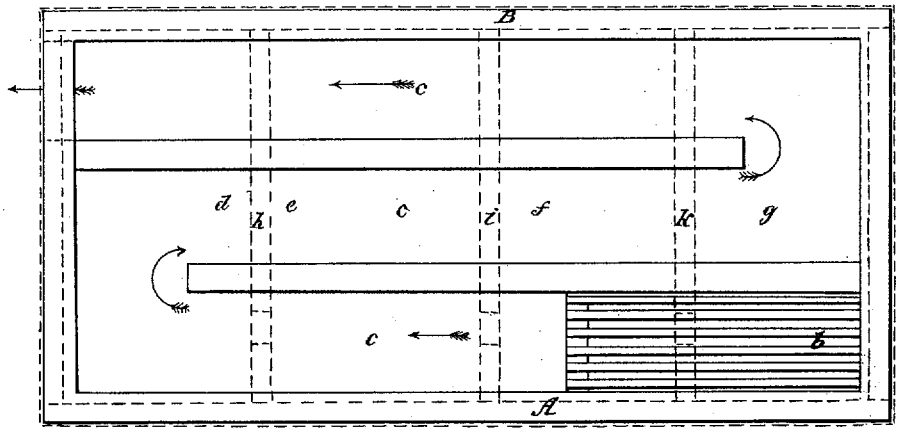
Figure 3:
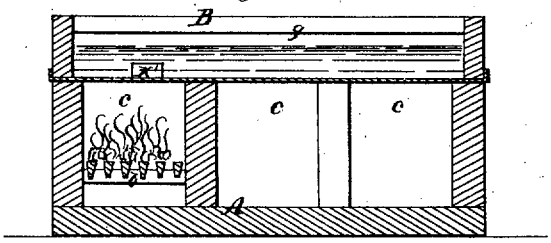

Figure 1 represents a longitudinal vertical section of my invention. Fig. 2 is a transverse vertical section of the same. Fig. 3 is a plan or top view of the same, the pan being indicated in red outline.

Similar letters of reference in the three views indicate corresponding parts.

This invention consists in the employment or use of a furnace with a return flue or flues in such a manner that the heat applied to the liquid in the pan is graduated from the highest temperature in one portion of the pan down to below the boiling-point in the other portion or portions, and that thereby the same is thrown off toward the coolest portion or portions of said pan, whence it can easily be removed and the danger of imparting an unpleasant taste to the molasses by boiling the sap in the mass is obviated; and, furthermore, a saving of fuel is effected.

To enable those skilled in the art to make and use my invention, I will proceed to describe it.

A represents a furnace which is built up of brick or any other suitable material, and to which access is had through the fire-door *a*. The fire is made on the grate *b*, and thence a flue, *c*, extends back to the rear end of the furnace, returning through the middle to the front end, and then back again on the opposite side of the furnace to its rear end, where it terminates. The course of this return-flue may, however, be changed at pleasure, either crosswise or lengthwise, and in the drawings its course and that of the products of combustion is indicated by arrows in Fig. 3.

B represents the evaporating-pan, which is made of wood with a sheet-metal bottom, or which may be constructed in any other suitable manner. It is placed on the top of the furnace A, so that its whole bottom, with the exception of those portions right over the partition-walls of the flue, is exposed to the direct action of the heat, and said pan is divided into a series of compartments, *d e f g*, by partitions *h i k*, which extend from one side of the pan to the other. The several compartments communicate with each other through openings *h′ i′ k′*, which may be closed by gates, so that the current of liquid through them can be regulated. These openings are nearer to one side of the pan than to the other, as clearly shown in Fig. 2 of the drawings, and the pan is placed on the furnace in such a position that said openings are over the hottest part of the furnace or of the flue *c*.

The juice is admitted into the pan at that corner farthest from the grate *b* and nearest to the chimney, where the temperature in the pan is the lowest, and in passing through the compartment *d* to the opposite or hottest side of the pan it (the juice) is gradually raised to the boiling-heat, and the scum, which rises to the surface, is thrown back to the coolest part of the pan, where the temperature is below the boiling-point. By having the openings *h i k* on the hottest side of the pan all the juice is compelled to pass to that side, and in every compartment the scum, which rises when the boiling commences, is thrown toward the cool side of the pan, where it can readily be removed. By these means all the scum is made to collect on that part of the pan where the temperature is below the boiling-point, and the danger of imparting an unpleasant taste to the molasses by boiling the scum or acrid matter with the liquid is avoided. Furthermore, by having the scum collected on one side of the pan, the labor of removing the same is reduced, and can easily be attended to by one person, whereas with such pans, where the scum collects on both sides, it requires two persons to remove the same; or if one person attempts to do it it requres much labor and exertion in running from one side of the pan to the other. The return-flue may, however, be so arranged that the scum collects at the end or ends, or at both sides of the pan, and with pans of very large capacity this arrangement may be preferable.

By the use of the return-flue a considerable saving in fuel is effected, the heat of the fire being made to pass several times backward and forward under the pan before it is allowed to escape at the chimney. In brief, my pan possesses in a great degree the very desirable properties of cheapness and simplicity, it effects a saving in fuel and in labor, and it improves the quality of the article produced.

What I claim as new, and desire to secure by Letters Patent, is—

The return-flue C, applied in combination with the furnace A, and pan B, substantially in the manner and for the purpose herein set forth.

F. D. DRAKE.

Witnesses:
CORNELIUS SCHNURR,
A. R. HILLYER.